United States Patent
Feng et al.

(10) Patent No.: US 11,531,825 B2
(45) Date of Patent: *Dec. 20, 2022

(54) INDICIA READER FOR SIZE-LIMITED APPLICATIONS

(71) Applicant: Hand Held Products, Inc., Fort Mill, SC (US)

(72) Inventors: Chen Feng, Snohomish, WA (US); Edward C. Bremer, Victor, NY (US); Tao Xian, Bordentown, NJ (US); Sean Philip Kearney, Marlton, NJ (US); Mehul Patel, Newton, PA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/002,546

(22) Filed: Aug. 25, 2020

(65) Prior Publication Data
US 2020/0387681 A1     Dec. 10, 2020

Related U.S. Application Data

(63) Continuation of application No. 15/605,312, filed on May 25, 2017, now Pat. No. 10,789,435, which is a
(Continued)

(51) Int. Cl.
*H04M 1/00* (2006.01)
*G06K 7/10* (2006.01)
*H04M 1/02* (2006.01)

(52) U.S. Cl.
CPC ..... *G06K 7/10732* (2013.01); *G06K 7/10881* (2013.01); *H04M 1/0202* (2013.01); *G06K 2207/1011* (2013.01)

(58) Field of Classification Search
CPC .......... G06K 7/10732; G06K 7/10881; G06K 2207/1011; H04M 1/0202
See application file for complete search history.

(56) References Cited

U.S. PATENT DOCUMENTS

| | | |
|---|---|---|
| 5,363,202 A | 11/1994 | Udagawa et al. |
| 6,381,030 B1 | 4/2002 | Udagawa et al. |

(Continued)

FOREIGN PATENT DOCUMENTS

| | | |
|---|---|---|
| CN | 1391680 A | 1/2003 |
| CN | 1832212 A | 9/2006 |

(Continued)

OTHER PUBLICATIONS

US 8,548,242 B1, 10/2013, Longacre (withdrawn)
(Continued)

*Primary Examiner* — Xin Jia
(74) *Attorney, Agent, or Firm* — Alston & Bird LLP

(57) ABSTRACT

An indicia-reading module is capable of integration into the smallest face of thin-profile smart device. The module employs chip-on-board packaging and a customized sensor enclosure to eliminate the stack-up height found in conventional packaging. The module also employs a customized frame to reduce volume by integrating circuit subassembly circuit boards into a unique architecture and by serving as the lenses for the illuminator and the aimer, thereby eliminating the need for any extra lenses or holders.

20 Claims, 7 Drawing Sheets

Related U.S. Application Data continuation of application No. 14/200,405, filed on Mar. 7, 2014, now Pat. No. 9,665,757.

(56) References Cited

U.S. PATENT DOCUMENTS

| | | |
|---|---|---|
| 6,388,767 B1 | 5/2002 | Udagawa et al. |
| 6,832,725 B2 | 12/2004 | Gardiner et al. |
| 7,097,101 B2 | 8/2006 | Kogan et al. |
| 7,128,266 B2 | 10/2006 | Zhu et al. |
| 7,159,783 B2 | 1/2007 | Walczyk et al. |
| 7,270,274 B2 | 9/2007 | Hennick et al. |
| 7,279,782 B2 | 10/2007 | Yang et al. |
| 7,296,751 B2 | 11/2007 | Barber et al. |
| 7,413,127 B2 | 8/2008 | Ehrhart et al. |
| 7,500,614 B2 | 3/2009 | Barber et al. |
| 7,533,824 B2 | 5/2009 | Hennick et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,559,957 B2 | 10/2013 | Hunzinger |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,593,539 B2 | 11/2013 | Ogawa |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,736,909 B2 | 5/2014 | Sato et al. |
| 8,740,082 B2 | 6/2014 | Wilz, Sr. |
| 8,740,085 B2 | 6/2014 | Furlong et al. |
| 8,743,275 B1 | 6/2014 | Han |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |

(56) References Cited

U.S. PATENT DOCUMENTS

| | | |
|---|---|---|
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | Mccloskey et al. |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van et al. |
| 9,424,454 B2 | 8/2016 | Tao et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| D771,631 S | 11/2016 | Fitch et al. |
| 9,507,974 B1 | 11/2016 | Todeschini |
| D777,166 S | 1/2017 | Bidwell et al. |
| D783,601 S | 4/2017 | Schulte et al. |
| D785,617 S | 5/2017 | Bidwell et al. |
| D785,636 S | 5/2017 | Oberpriller et al. |
| 9,665,757 B2 | 5/2017 | Feng et al. |
| D790,505 S | 6/2017 | Vargo et al. |
| D790,546 S | 6/2017 | Zhou et al. |
| D790,553 S | 6/2017 | Fitch et al. |
| 9,786,101 B2 | 10/2017 | Ackley |
| 9,857,167 B2 | 1/2018 | Jovanovski et al. |
| 9,891,612 B2 | 2/2018 | Charpentier et al. |
| 9,892,876 B2 | 2/2018 | Bandringa |
| 9,954,871 B2 | 4/2018 | Hussey et al. |
| 9,978,088 B2 | 5/2018 | Pape |
| 10,007,112 B2 | 6/2018 | Fitch et al. |
| 10,038,716 B2 | 7/2018 | Todeschini et al. |
| 10,066,982 B2 | 9/2018 | Ackley et al. |
| 10,360,728 B2 | 7/2019 | Venkatesha et al. |
| 10,401,436 B2 | 9/2019 | Young et al. |
| 10,789,435 B2 | 9/2020 | Feng et al. |
| 2001/0038547 A1 | 11/2001 | Jigour et al. |
| 2003/0029917 A1 | 2/2003 | Hennick et al. |
| 2003/0089776 A1 | 5/2003 | Hennick et al. |
| 2004/0069855 A1 | 4/2004 | Patel et al. |
| 2004/0159703 A1 | 8/2004 | Kogan et al. |
| 2004/0195328 A1 | 10/2004 | Barber et al. |
| 2006/0038108 A1* | 2/2006 | Belau .................... H05K 1/142 |
| | | 348/E5.025 |
| 2006/0202210 A1 | 9/2006 | Mok et al. |
| 2006/0274171 A1 | 12/2006 | Wang |
| 2006/0285100 A1 | 12/2006 | Hamatani et al. |
| 2007/0040034 A1 | 2/2007 | Hennick et al. |
| 2007/0045422 A1 | 3/2007 | Ito |
| 2007/0063048 A1 | 3/2007 | Havens et al. |
| 2007/0085185 A1 | 4/2007 | Vos |
| 2008/0135728 A1 | 6/2008 | Yang et al. |
| 2008/0185432 A1 | 8/2008 | Caballero et al. |
| 2009/0044003 A1* | 2/2009 | Berthiaume .......... G06F 16/955 |
| | | 713/100 |
| 2009/0059616 A1 | 3/2009 | Wittenberg et al. |
| 2009/0088203 A1 | 4/2009 | Havens et al. |
| 2009/0134221 A1 | 5/2009 | Zhu et al. |
| 2009/0242641 A1 | 10/2009 | Blasczak |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0327067 A1* | 12/2010 | Drzymala .......... G06K 7/10792 |
| | | 235/462.01 |
| 2011/0169999 A1 | 7/2011 | Grunow et al. |
| 2011/0202554 A1 | 8/2011 | Powilleit et al. |
| 2011/0309151 A1* | 12/2011 | Cudzilo ............ G06K 7/10564 |
| | | 235/470 |
| 2012/0111946 A1 | 5/2012 | Golant |
| 2012/0138685 A1 | 6/2012 | Qu et al. |
| 2012/0153022 A1 | 6/2012 | Havens et al. |

(56) References Cited

U.S. PATENT DOCUMENTS

| | | |
|---|---|---|
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0193429 A1 | 8/2012 | Van et al. |
| 2012/0193431 A1 | 8/2012 | Hawley et al. |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0044257 A1 | 2/2013 | Chien et al. |
| 2013/0056285 A1 | 3/2013 | Meagher |
| 2013/0068840 A1 | 3/2013 | Kearney |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0231157 A1 | 9/2013 | Chung |
| 2013/0238140 A1 | 9/2013 | Malchiondo et al. |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedrao |
| 2013/0306734 A1 | 11/2013 | Xian et al. |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002676 A1 | 1/2014 | Ning |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034734 A1 | 2/2014 | Sauerwein, Jr. |
| 2014/0036848 A1 | 2/2014 | Pease et al. |
| 2014/0038222 A1 | 2/2014 | Alt et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | Mccloskey et al. |
| 2014/0104414 A1 | 4/2014 | Mccloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0224874 A1* | 8/2014 | Shiraishi ............ G06K 7/10831 |
| | | 235/383 |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van et al. |

(56) References Cited

U.S. PATENT DOCUMENTS

| | | |
|---|---|---|
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0078678 A1* | 3/2015 | Grandin .................. G06T 11/60 |
| | | 382/284 |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Ettinelli et al. |
| 2015/0100196 A1 | 4/2015 | Hollifield |
| 2015/0102109 A1 | 4/2015 | Huck |
| 2015/0104103 A1 | 4/2015 | Candelore |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Worton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0377414 A1 | 12/2016 | Thuries et al. |

FOREIGN PATENT DOCUMENTS

| | | |
|---|---|---|
| CN | 101517733 A | 8/2009 |
| CN | 102682264 A | 9/2012 |
| CN | 103780847 A | 5/2014 |
| EP | 2482226 A2 | 8/2012 |
| WO | 2013/163789 A1 | 11/2013 |
| WO | 2013/173985 A1 | 11/2013 |
| WO | 2014/019130 A1 | 2/2014 |
| WO | 2014/110495 A1 | 7/2014 |

OTHER PUBLICATIONS

US 8,616,454 B2, 12/2013, Havens et al. (withdrawn)
Extended European search report dated Apr. 21, 2021 for EP Application No. 21150322, 6 pages.
U.S. Appl. No. 15/605,312, filed May 25, 2017, U.S. Pat. No. 10,789,435.
U.S. Appl. No. 14/200,405, filed Mar. 7, 2014, U.S. Pat. No. 9,665,757.
Decision to grant a European patent dated Jan. 14, 2021 for EP Application No. 15156203.
Advisory Action (PTOL-303) dated Apr. 28, 2016 for U.S. Appl. No. 14/200,405.
Advisory Action (PTOL-303) dated Jan. 28, 2020 for U.S. Appl. No. 15/605,312.
Advisory Action (PTOL-303) dated Oct. 19, 2018 for U.S. Appl. No. 15/605,312.
Applicant Initiated Interview Summary (PTOL-413) dated Jan. 30, 2020 for U.S. Appl. No. 15/605,312.
English-translation of First Office Action in related Chinese Application No. 201210411590.8 dated Sep. 4, 2017, pp. 1-11.
English-translation of Second Office Action in related Chinese Application No. 201210411590.8 dated Feb. 26, 2018, pp. 1-8.
European Search Report and Search Opinion Received for EP Application No. 15156203.0, dated Jul. 8, 2015, 7 pages.
Examiner initiated interview summary (PTOL-413B) dated Jan. 28, 2020 for U.S. Appl. No. 15/605,312.
Examiner initiated interview summary (PTOL-413B) dated Oct. 19, 2018 for U.S. Appl. No. 15/605,312.
Final Rejection dated Aug. 14, 2018 for U.S. Appl. No. 15/605,312.
Final Rejection dated Feb. 14, 2020 for U.S. Appl. No. 15/605,312.
Final Rejection dated Feb. 22, 2016 for U.S. Appl. No. 14/200,405.
Final Rejection dated Mar. 7, 2019 for U.S. Appl. No. 15/605,312.
Final Rejection dated Nov. 4, 2019 for U.S. Appl. No. 15/605,312.
First Office Action in related Chinese Application No. 201210411590.8 dated Sep. 4, 2017, pp. 1-8.
Intention to Grant for related European Application No. 15156203.0 dated Apr. 14, 2020, 7 pages.
Intention to Grant for related European Application No. 15156203.0 dated Aug. 17, 2020, 8 pages.
Non-Final Rejection dated Apr. 27, 2018 for U.S. Appl. No. 15/605,312.
Non-Final Rejection dated Aug. 31, 2015 for U.S. Appl. No. 14/200,405.

(56) References Cited

OTHER PUBLICATIONS

Non-Final Rejection dated Jun. 2, 2016 for U.S. Appl. No. 14/200,405.
Non-Final Rejection dated Jun. 21, 2019 for U.S. Appl. No. 15/605,312.
Non-Final Rejection dated Nov. 23, 2018 for U.S. Appl. No. 15/605,312.
Notice of Allowance and Fees Due (PTOL-85) dated Aug. 20, 2020 for U.S. Appl. No. 15/605,312.
Notice of Allowance and Fees Due (PTOL-85) dated Jan. 25, 2017 for U.S. Appl. No. 14/200,405.
Notice of Allowance and Fees Due (PTOL-85) dated Jun. 22, 2020 for U.S. Appl. No. 15/605,312.
Notice of Allowance and Fees Due (PTOL-85) dated May 21, 2020 for U.S. Appl. No. 15/605,312.
Official Communication in related European Application No. 15156203.0 dated Nov. 4, 2019, 5 pages.
Second Office Action in related Chinese Application No. 201210411590.8 dated Feb. 26, 2018, pp. 1-9.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/283,282 for Terminal Having Illumination and Focus Control filed May 21, 2014 (Liu et al.); 31 pages; now abandoned.
U.S. Appl. No. 14/446,391 for Multifunction Point of Sale Apparatus With Optical Signature Capture filed Jul. 30, 2014 (Good et al. ); 37 pages; now abandoned.
EP Office Action dated Oct. 4, 2022 for EP Application No. 21150322, 3 pages.

* cited by examiner

INDICIA READER FOR SIZE-LIMITED APPLICATIONS

CROSS-REFERENCE TO RELATED APPLICATIONS

The present application is a continuation of U.S. application Ser. No. 15/605,312, filed May 25, 2017 (and published Sep. 14, 2017 as U.S. Patent Publication No. 2017/0262677), which is a continuation of U.S. patent application Ser. No. 14/200,405 for an Indicia Reader for Size-Limited Applications filed Mar. 7, 2014 (and published Sep. 10, 2015 as U.S. Patent Publication No. 2015/0254485), now U.S. Pat. No. 9,665,757. Each of the foregoing patent applications, patent publications, and patent is hereby incorporated by reference in its entirety.

FIELD OF THE INVENTION

The present invention relates to the field of indicia readers, more specifically, to an imaging barcode reader module suitable for integration into a slim, hand-supportable, mobile device.

BACKGROUND

Over the past forty years, businesses have sought to maximize efficiency by using various devices to automate data entry. In the important area of inventory management, in particular, the symbol reading device (e.g., barcode reader, barcode scanner or RFID reader) has greatly reduced the time and errors inherent to manual data entry. Symbol reading devices are often employed to decode barcodes. A barcode is a machine-readable representation of information in graphic format. Traditionally, a barcode is a series of parallel bars and spaces of varying widths (e.g., a linear barcode or 1D barcode). More recently, there has been an increase in the use of alternatives to the linear barcode, for example matrix codes (e.g., 2D barcodes, QR Code, Aztec Code, and Data Matrix) and Optical Character Recognition (OCR) have enjoyed increasing popularity as the technology advances. As used herein, the terms barcode, indicia, and code-symbol are intended in their broadest sense to include linear barcodes, matrix barcodes, and OCR-enabled labels.

Indicia readers (e.g., barcode readers) tend to fall into one of three categories: wand readers, laser scan engine barcode readers, and image sensor based barcode readers. Wand readers generally include a single light source and single photodetector housed in a pen shaped housing. A user drags the wand reader across a code symbol (e.g., a barcode) and a signal is generated representative of the bar space pattern of the barcode. Laser scan engine-based barcode readers typically include a laser diode assembly generating a laser light beam and a moving mirror for sweeping the laser light beam across a code symbol, wherein a signal is generated corresponding to the code symbol. Image-sensor-based barcode readers typically include multi-element image sensors such as CID, CMOS, or CCD image sensors and an imaging optic for focusing an image onto the image sensor. In the operation of an image-sensor-based barcode reader, an image of a code symbol is focused on an image sensor and a signal is generated corresponding to the code symbol. Image sensor elements may be arrayed in a line or in a rectangular matrix or area. Area image sensors capture a digital picture and use software algorithms to find and decode one or more symbols. Users of laser scanner engine-based barcode readers have been switching in increasing numbers to image sensor based barcode readers. Image sensor based barcode readers offer additional features and functions relative to laser scan engine based barcode readers. These features and functions result from image processing algorithms. The limits of which are typically based on the processing resources available from the device.

Virtually all thin-profile, hand-supportable, smart-devices (e.g., smart-phones) now have integrated cameras. Accordingly, numerous applications capable of utilizing the integrated camera for indicia reading have been developed for these devices. While these applications perform reasonably well for the casual user, they lack the features and functions present in dedicated devices. Illumination, aiming, stabilization, and focusing could all suffer when using a general purpose mobile imaging device for indicia reading. The lack of dedicated resources could slow performance and compromise efficiency in fast paced work environments.

Typical users want to carry only one device and will be reluctant to trade their smart-device for a scanner. A need, therefore, exists for an indicia-reading module with all of the features of a dedicated scanner device that can integrate with a smart-device without being bulky. Such a module could integrate internally or externally. If internal, the module would have dimensions allowing for seamless integration into the smart device and would be easy for the user to operate with one hand. To this end an indicia-reader module that integrates into the smallest area side of the smart device (i.e., narrow-edge integration) would operate much like a hand-held, remote control which most users know well. This integration, however, puts severe limitations on the design of such a dedicated image-based optical scanner module. Unique design approaches and construction methods must be combined to allow for such novel integration.

SUMMARY

Accordingly, in one aspect, the present invention embraces a module for reading indicia, such as barcodes. An exemplary indicia-reading module is configured to facilitate narrow-edge integration into a thin-profile smart device.

The exemplary indicia-reading module includes a sensor module, an illuminator-aimer circuit subassembly, a processing circuit subassembly, and an interface circuit subassembly. The sensor module includes an adjustable imaging lens for imaging the indicia-reading module's field of view onto a sensor circuit, which includes a plurality of pixels. The illuminator-aimer circuit subassembly is configured both to project electromagnetic radiation toward indicia within the indicia-reading module's field of view and to project a sighting pattern that corresponds with the indicia-reading module's field of view. The processing circuit subassembly is configured to render (e.g., decode) indicia information. The interface circuit subassembly is configured to connect the indicia-reading module to a host device (e.g., a computer or smart device).

The sensor module captures the image of indicia. The module is constructed around a sensor integrated circuit die (i.e., sensor IC circuit) that is chip-on-board (COB) packaged to a substrate and wire-bonded to external circuitry and connectors, with care taken to ensure that there is no wire crossover. A filter and an adjustable lens are held in close proximity above the sensor integrated circuit by a housing, which is attached to the substrate. The adjustable imaging lens focuses the indicia-reading module's field of view onto a plurality of pixels that typically include the active area of the sensor IC circuit while a filter removes unwanted electromagnetic radiation. The housing, the filter, and the substrate are joined in such a way as to hermetically seal the sensor integrated circuit from the outside environment.

The illuminator-aimer circuit subassembly has two functions, namely to illuminate the field of view and to help the user aim the module's field of view onto the indicia. The illuminator-aimer module uses two subcircuits to achieve these functions. Each subcircuit uses a light source (e.g., light emitting diode, LED) that projects light through an aperture and a corresponding lens towards a target. The illuminator subcircuit projects a uniform light pattern to highlight the module's field of view and thereby enhance the sensor performance, while the aimer subcircuit projects a sighting pattern that corresponds with the center of the module's field of view and helps the user position the indicia properly for the sensor. This sighting pattern can be a cross hair pattern or simply a dot to indicate the center of the field of view. In addition, the aimer subcircuit can project a highly visible line(s) or framing pattern(s) corresponding to the edges and/or corners of the exact field of view.

The processing circuit subassembly renders the signals from all the sensor circuit's pixels into a composite image (e.g., text image or bitmap), and can then process and/or store the image for barcode decoding. After decoding, the barcode information is passed to the interface circuit subassembly, which helps provide communication with the host device (e.g., a computer).

The sensor module is built on a thermally stable substrate and each circuit subassembly is built onto its own unique circuit board, each composed of thin, rigid-flex board material. The substrate and boards are electrically interconnected with flex cabling and all held into a small volume with a frame. The circuit boards snap into fittings molded into the frame and therefore do not require extra hardware. The frame, which is typically constructed of clear polycarbonate, has lenses molded into its sides so that when the illuminator-aimer circuit subassembly is in position the frame serves as both the illuminator lens and the aimer lens. The small volume of the indicia-reading module allows it to be integrated into the edge of a thin profile device.

In a related aspect, the present invention embraces a smart phone employing the exemplary indicia-reading module. In particular, the smart phone includes a computer, a display, and the indicia-reading module, which is physically integrated (e.g., narrow-edge integrated) within a slim hand-supportable housing. The smart phone typically possesses a substantially rectangular cuboid shape whose thickness is substantially smaller than both its height and its width (e.g., no more than 20 percent of either the length or the width). The indicia-reading module may be integrated to the smart phone with mounting pins and screws to prevent the deformation of the module and keep all components in place under shock and vibration.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces an indicia reader integrated into the smallest side (i.e., the narrowest edge) of a hand held smart device (e.g., smart-phone or digital assistant). These devices are ultra-lightweight, pocket-sized devices that are easy to carry and operate with a single hand, which necessarily limits the size of the device.

Figure 1:
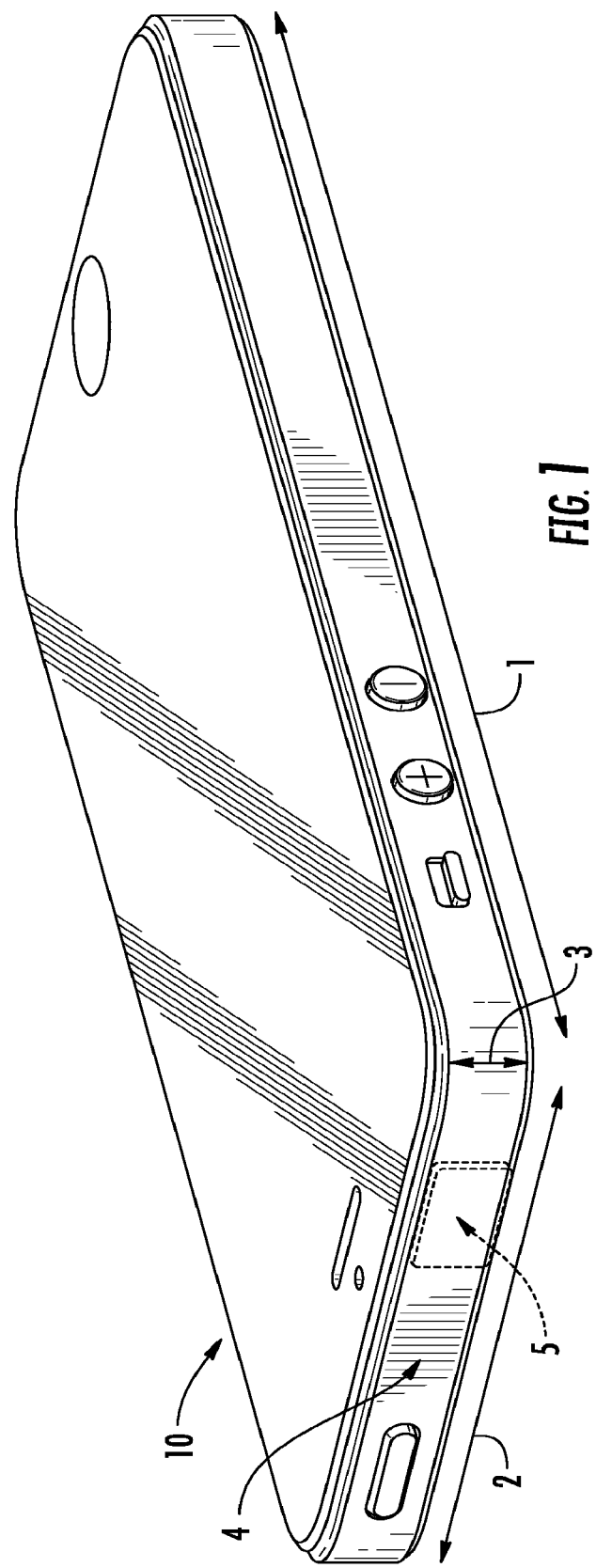
FIG. 1 depicts an exemplary handheld smart device.

Smart phones 10, such as shown in FIG. 1, tend to be rectangular cuboids whose thickness is substantially smaller than both its height and its width. For example a smart phone device (neglecting tapers) can have a length dimension 1, a width dimension 2, and a thickness dimension 3 of roughly 115 millimeters×59 millimeters×9 millimeters. These dimensions may vary, but some general rules apply. The length and width determine the display size and are usually driven by user interface requirements. The thickness 3 plays an important role in the ease of handling. Thinner devices are easier to hold and manipulate. Thinner devices, however, make the integration of application specific modules, either internally or externally, most challenging.

FIG. 1 depicts an exemplary embodiment of a scanner that is integrated into a smart phone device. The window 5 of the integrated scanner module, shown in the "narrow edge" 4 of the device, allows for easy one-hand scanning. To achieve such an embodiment requires the integration of space-saving techniques that, when combined, produce an ultra-small integration package.

Figure 2:
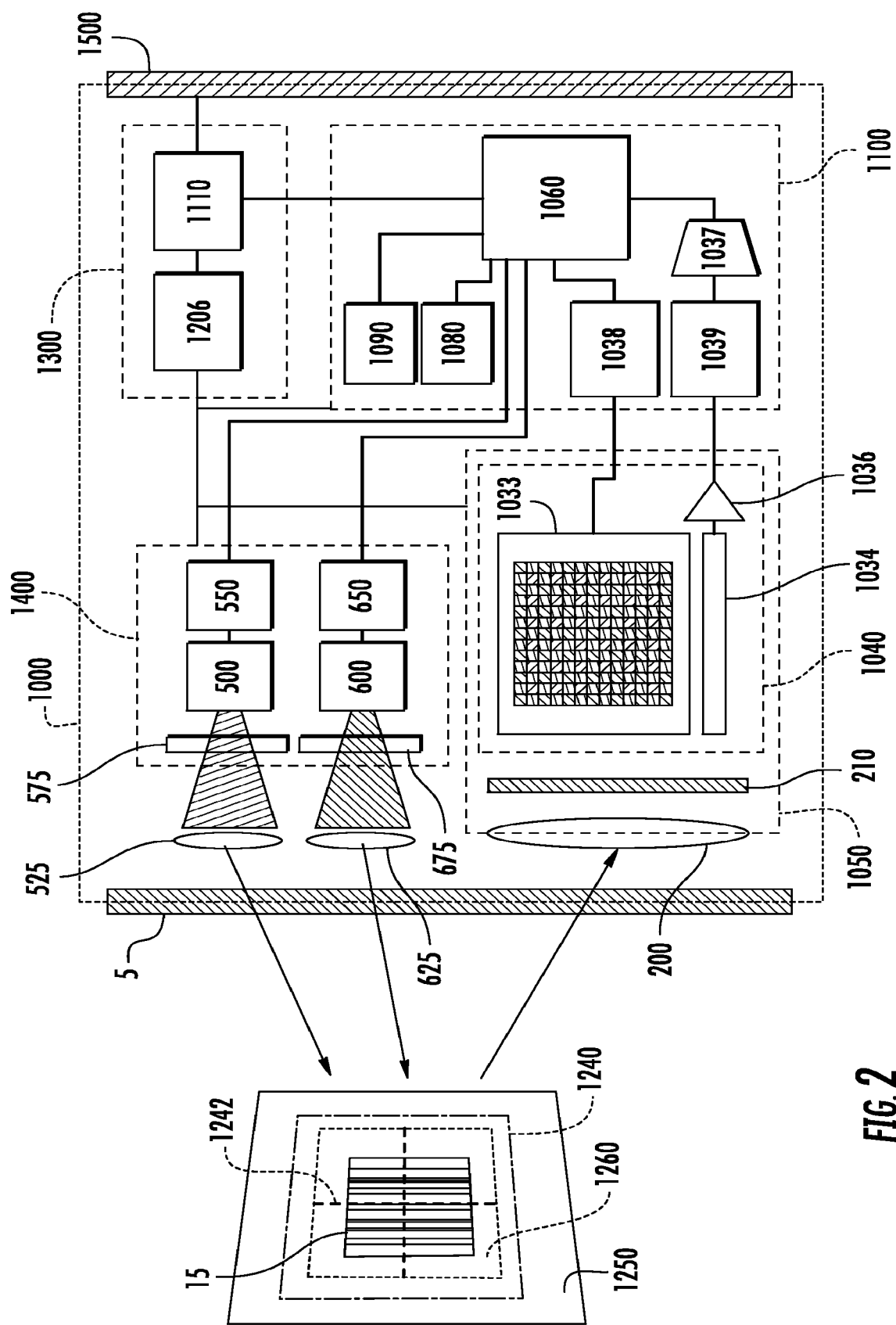
FIG. 2 depicts a block diagram of an exemplary indicia-reader module.

FIG. 2 shows a general block diagram of the indicia-reader module 1000. The indicia-reader module typically includes a sensor module 1050 including an adjustable imaging lens 200 for imaging the indicia-reader module's field of view 1240 onto a sensor integrated circuit (IC) diced from a wafer of like sensor circuits (i.e., sensor IC die) 1040. The sensor IC die 1040 contains an image capture area (i.e., active area) 1033 that includes a plurality of pixels arranged in rows and columns and sensitive to the light reflected from the target 1250. The sensor IC die 1040 may implement CCD or CMOS technology configured in one of many ways to convert the photonic energy into an electric signal. In one embodiment, an image is focused onto the active area 1033 of the sensor IC die 1040. The active area 1033 is exposed to the imaged light via a physical or electronic shutter. If electronic, the specific kind of shutter (i.e., rolling or global) depends on the image sensor implementation in regards to type (i.e., CMOS or CCD) and readout architecture (i.e., full-frame or interline). During the exposure a charge is created in each pixel; the charge depends on the image intensity in that small region. After the exposure is complete, the charges from the pixels are shifted row by row into a shift register 1034 where they then shift out one-by-one and are amplified via an amplifier 1036 that may be built into the sensor IC die 1040. The exposure, readout, timing, and other operational settings are controlled by the image sensor timing and control circuit 1038. The amplified analog signal is rendered suitable for digital conversion by a processing circuit 1039 and then converted into a digital signal via an analog-to-digital (A/D) converter 1037. The digital image is reconstructed and reformatted from the digitized pixel information by the central processing unit (i.e., CPU) 1060. Different sensor IC die will have different levels of integration. While the basic flow described here remains the same, some block diagram components may be integrated within the sensor IC die in different embodiments.

The image active area 1033 may respond to a variety of optical wavelengths. In cases where color information is desired the active area may be placed under a Bayer filter or other color composite filter and then post-processed to render a color image. In most cases it is also important to include a filter 210 (e.g., infrared (IR) blocking filter) to keep stray light from overloading the active area electronics or changing the perceived color information. In other embodiments, this filter may not be necessary or may be one tuned for different wavelengths (e.g., tri-band-pass filter). In addition, the active area is typically fabricated from silicon but can be made from different materials in order to achieve sensitivity to different optical wavelengths such as infra-red (IR).

The packaging of electronics and optics can affect the integration of devices into small volumes. One method pursued here to reduce the package volume for the sensor module 1050 repackages a sensor IC die 1040 into a custom package so that, in effect, the lens 200 and IR blocking filter 210 become incorporated in the sensor IC package. To accomplish this, the sensor IC die is packaged using a method call chip-on-board (COB). Chip-on-Board, or COB, packaging refers to the semiconductor assembly technology in which the sensor IC die 1040 is directly mounted on and electrically interconnected to its final circuit board instead of undergoing traditional assembly or packaging as an individual IC. The elimination of conventional device packaging from COB assemblies shrinks the final product, as well as improves its performance as a result of the shorter interconnection paths. In addition to these advantages, the COB packaging eliminates the redundant sensor cover glass, thereby reducing light loss, optical aberrations, and related image defects.

Aside from circuit boards used for COBs, various substrates are available for use in this approach. There are, for instance, ceramic and glass ceramic substrates which exhibit excellent thermal properties that are especially important in imaging applications. Organic substrates that weigh and cost less while providing a low dielectric constant also exist. There are also flex substrates that are very thin. These kinds of assemblies have received a number of other names aside from "COB" based on available substrates (e.g., chip-on-glass (COG), chip-on-flex (COF), etc.).

Figure 3:
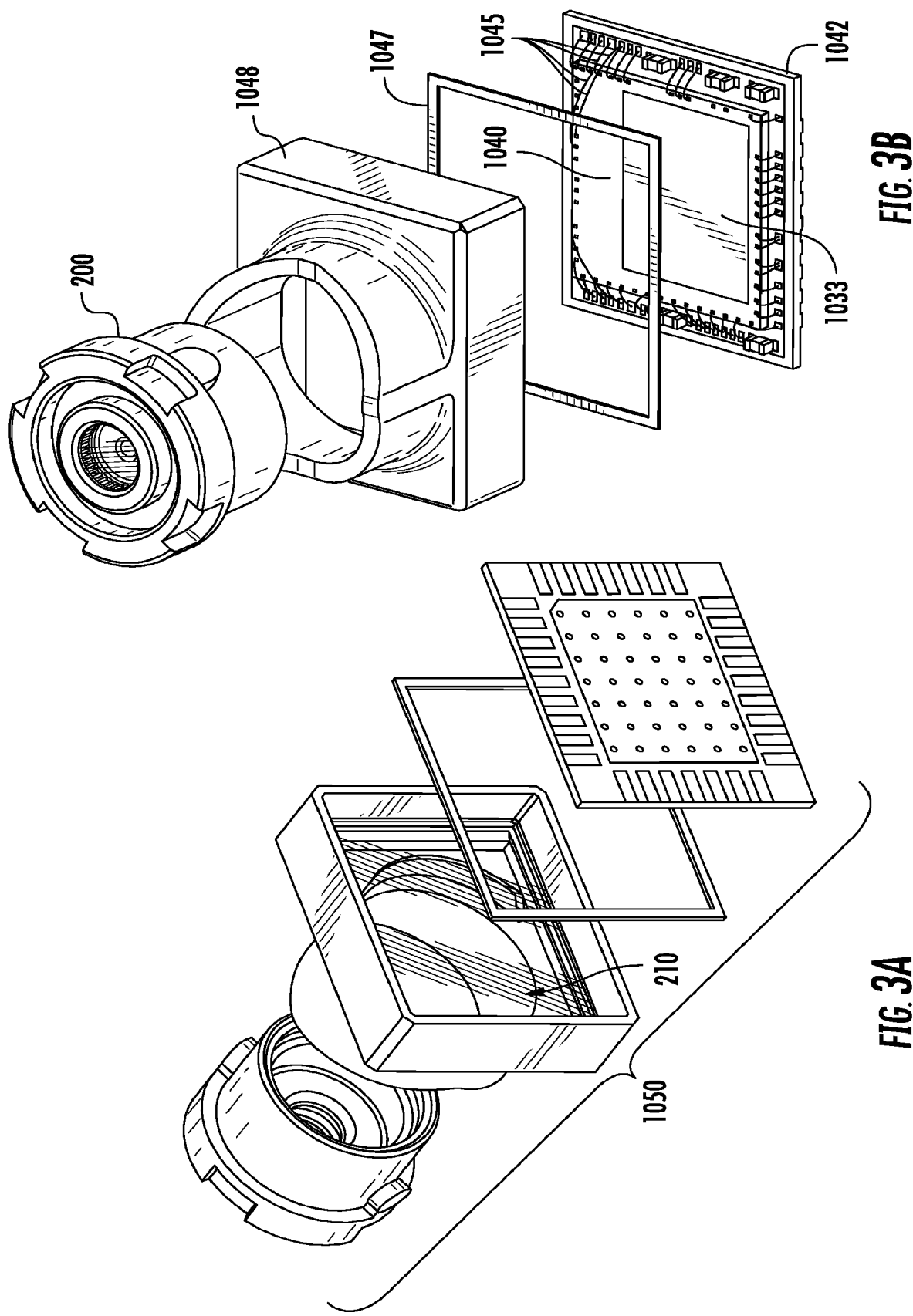
FIGS. 3A and 3B depict exploded views of an exemplary sensor module.

As shown in FIG. 3A and FIG. 3B, the sensor module 1050 is built around the sensor IC die 1040. The die 1040 is first mounted to a substrate 1042 using adhesive. The adhesive application may be in the form of dispensing, stencil printing, or pin transfer. The die placement must be accurate enough to ensure proper orientation and good planarity of the die. After the die is set, a curing process (such as exposure to heat or ultraviolet light) allows the adhesive to attain its final mechanical, thermal, and electrical properties. Any organic contaminants resulting from the curing must be removed either by plasma or solvent cleaning so as not to affect the subsequent wire bonding process.

Wire bonding is used to make the electrical connection between the substrate 1042 and the connectors and electronics of the sensor IC die 1040. The bond wires 1045 may be aluminum, copper, or gold and typically have diameters ranging from 15 microns to 100 microns. The wires are attached at both ends using some combination of heat, pressure, and ultrasonic energy to make a weld. No crossover of the bond wires assures that there are no short circuits.

The wire-bonded die and substrate are glued with an adhesive gasket 1047 to a housing 1048 that holds the adjustable imaging lens 200 and the IR blocking filter 210. After the adhesive is set, the housing 1048 and substrate 1042 form a hermetic seal, thereby protecting the sensor IC die 1040 and the bond wires 1045.

As noted, the level of sensor module integration varies. For example in a non-decoded output module the image data is delivered directly to the host device for decoding. Because of this, the on-board requirements for processing, power management, and memory are relaxed. Here, the interface may include output image data presented in parallel (8-bit) or serial (SCI2), sync signals, and control signals. The embodiment of the indicia-reader module, as shown in FIG. 2, is known as a decoded output module, because it has the processing and electronics necessary to return a decoded response rather than a raw image. As shown in FIG. 2, a processing circuit subassembly 1100 includes the input and output circuitry for the sensor module 1038, 1039, as well as a central processing unit 1060 and RAM memory 1080 and flash memory 1090 for program and configuration data storage. Here, the central processing unit 1060 performs image processing and decoding. The interface can be either serial (e.g., RS232) or on a bus (e.g., USB) 1500.

In the decoded output configuration, the CPU 1060 decodes the indicia recorded in an image. The indicia can be decoded by processing the image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can include the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup. CPU 1060, which, as noted, can be operative in performing processing for attempting to decode decodable indicia, can be incorporated in an integrated circuit disposed on circuit board such as a rigid flex in order to obtain the thinnest board for small integration. Flex/rigid flex interconnections are used to electrically connect the processor circuit subassembly to the other subassemblies and modules.

The indicia-reading module 1000 can have an interface circuit subassembly 1300 as shown in FIG. 2. This circuit subassembly is built onto its own board and is connected to the bus 1500, other subassemblies, and modules via flex cabling. The interface circuit 1110 on this board serves to assist in the communication of data to and from the indicia-reader module 1000 and to transition power into the module and to the power circuit 1206 where it is conditioned and distributed within the indicia-reader module 1000.

FIG. 2 shows the interface of the module as a bus 1500. The bus 1500 is considered to be any communication system that transfers data (and power) between components inside the computer or, in this case, the smart hand-held device. The bus may be used to communicate data back and forth between the indicia-reader module 1000 and the host device or peripheral. Power may also be delivered over the bus. A power conditioning circuit, a battery, DC power supply, or any other source for providing power can use the bus to deliver power to the indicia-reading module. Finally diagnostic and programming devices may use the bus to deliver programming information or receive diagnostic information from the indicia-reader module.

As depicted in FIG. 2, the interface circuit subassembly 1300 also includes a power unit 1206 that protects against overloads and distributes power at the right level and at the right time to the various subassemblies and modules within the indicia-reader module. The power unit 1206 can include a charging circuit that is continually charged by a power supply and can be configured to output energy within a range of power levels to accommodate various operation characteristics. The power from this unit can be provided as constant current or constant voltage and is adjustable so that it can serve the constant power needs of the module as well as intermittent service to subsystems for such operations as illumination, exposure, focusing, and aiming.

The illuminator-aimer circuit subassembly 1400 is used to help the user align the indicia 15 within the module's field of view 1240 and to provide light for the sensor module to record with good fidelity. This circuit subassembly is built onto its own board and is connected to other subassemblies and modules via flex cabling.

As shown in FIG. 2, the illuminator-aimer circuit subassembly 1400 has two subsystems that perform similar actions. In general, it can be said that both are projection systems and as such can use a variety of optical technologies and methods (e.g., lenses, lightpipes, or diffractive optics) to achieve the objective of illuminating the scene and providing an aiming image. The illuminator driver circuit 550 and the aimer driver circuit 650 provide power (e.g., a constant current) to the illuminator light source 500 and aimer light source 600, respectively. The illuminator light source 500 and the aimer light source 600 may include an LED or bank of LEDs. Alternatively the aimer light source can be a laser diode to provide highly visible pattern in extra long range and under direct sun light. The illumination light source should provide light of sufficient intensity to allow for the sensor module 1050 to capture an image of low-noise and high dynamic range image with no saturation. The light should be uniform across the field of view for best results and at a wavelength that the sensor IC die 1040 was designed for (e.g., visible wavelength regime). Upon triggering the illuminator, driver circuit 550 causes the illuminator light source 500 to emit light. The light passes through a rectangular illuminator aperture 575. The image of this illuminator aperture 575 is formed on the target 1250 via the illuminator lens 525. Thus, in this embodiment, a rectangular image 1260 of uniform white light would appear on the target 1250.

To help alignment the user may also be provided with a sighting pattern 1242. This pattern is formed like the illumination pattern 1260. The light from the aimer light source 600 passes through an aimer aperture 675 (e.g., crosshair, line, or rectangle) and then is imaged via the aimer lens 625 to form a sighting pattern 1242 on the target 1250. When the user aligns the crosshairs with the center of the indicia, the indicia will image onto the center of the sensor ICs active area 1033. In one embodiment, the CPU 1060 can provide control inputs to all control circuits (e.g., the image sensor timing and control circuit 1038, the illuminator driver circuit 550, and the aimer driver circuit 650) and to the power unit 1206 to coordinate timing between image sensor array controls and illumination subsystem controls.

The imaging lens assembly 200 can be adapted for focusing an image of a decodable barcode 15, which is located within the field of view 1240, onto image sensor array 1033. Working distances should not vary so greatly that they cannot be accommodated by the depth of field and the size of the sensor. In this embodiment the imaging lens has relatively a high f-number (i.e., f/#) and thus a long depth of field to accommodate all normal usage scenarios, thereby precluding the need for active focusing. Active focusing could be used but would typically add complexity, size, and cost.

As depicted in FIG. 1, the window 5 of the indicia-reader module is integrated into a narrow edge of the smart device 4. This serves to seal the smart device and the sensor module to protect it from dust and debris. It also can perform some optical filtering, too, in order to reduce the unwanted stray light that otherwise would enter the device (e.g., possibly affecting performance).

Figure 4:
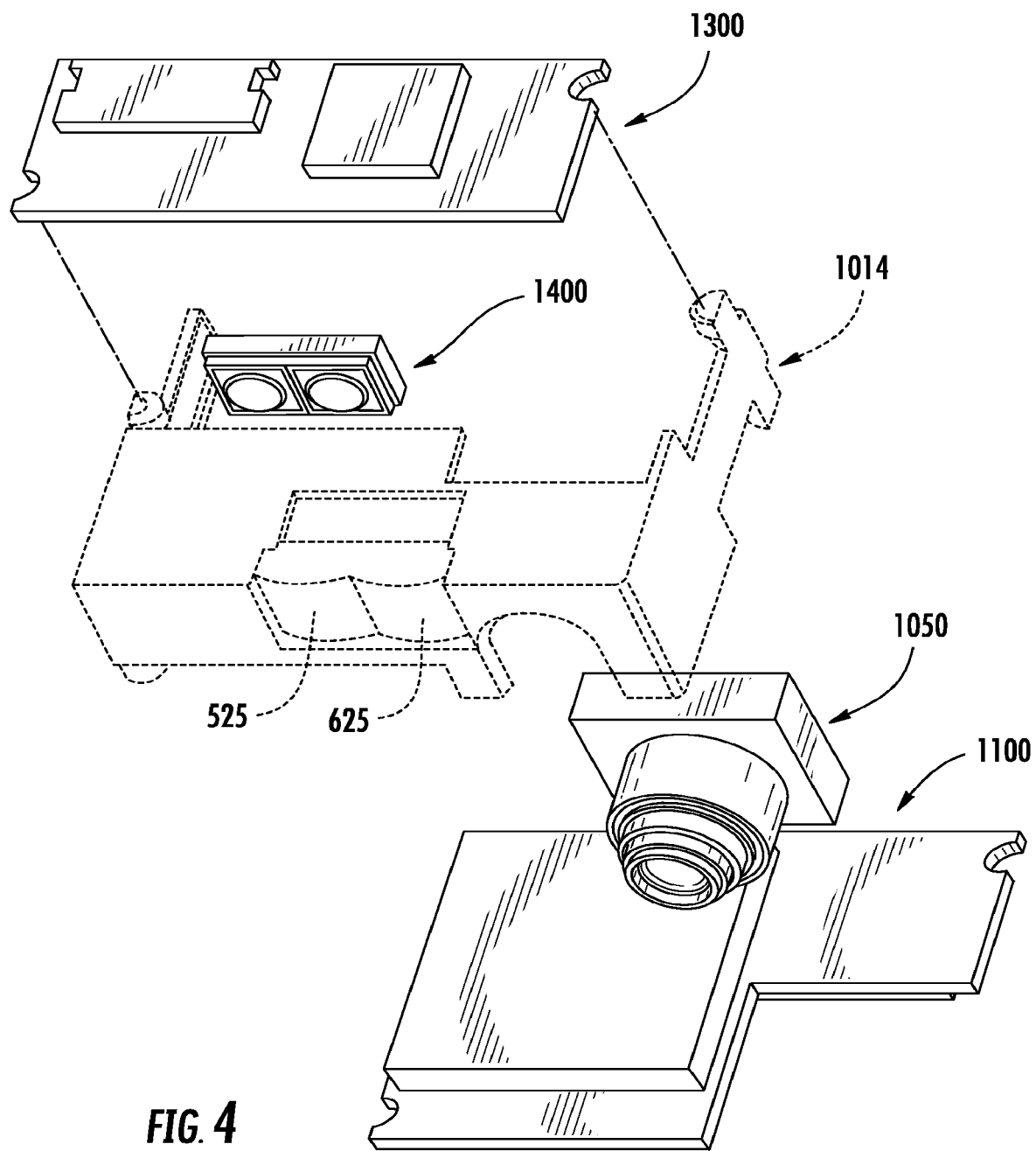
FIG. 4 depicts an exploded view of an exemplary indicia-reading module.

In summary, the indicia-reader module typically includes a (i) a sensor module 1050, (ii) an illuminator-aimer circuit subassembly 1400, (iii) a processing circuit subassembly 1100, and (iv) an interface circuit subassembly 1300. Each of these four modules (or subassemblies) is typically constructed on its own discrete circuit board or substrate and a variety of kinds may be used. Cabling can be used to interconnect the boards and, in this embodiment, flex or rigid-flex interconnections are used. FIG. 4 shows an exploded view of the indicia-reader module 1000 with the major modules and circuit subassemblies.

To fabricate the sensor module, the sensor IC die 1040 is first COB packaged with a substrate 1042, and then integrated with the module housing 1048 and the IR-cutoff filter 210 to form a hermetically sealed assembly. See FIGS. 3A and 3B. A dummy lens is then added to the housing 1048 to allow direct soldering or reflowing with surface mount technology (SMT) of any components on this substrate. After soldering, the real lens is inserted, focused, and secured into place. As depicted in FIG. 4, the sensor module 1050 and all the circuit subassemblies 1100, 1300, 1400 are attached (e.g., snap fit) to the frame 1014. The frame 1014 holds all the circuit boards and modules in place through the use of snap-fittings, which ensures cost and space efficiency. It is within the scope of the invention to employ other, less efficient techniques to attach the boards to the frame. The frame in this embodiment also functions as the lenses 525, 625 for the illuminator-aimer. The frame is typically made from a clear polycarbonate and molded or machined/polished in order to focus the projected illumination and aiming images. Here again, other methods could be used but not as efficiently (i.e., with respect to size and cost). The power and data interconnection between the boards use flex or rigid-flex cables and board connectors. The frame, along with screws and pins, help to secure the module within the smart device 10 in a way that reduces deformation and mitigates shock and vibration effects.

Various components like the imaging lens 200, the sensor IC die 1040, the CPU 1060, the memory 1080, and the interface communication 1110 can be selected to achieve the present invention. For example, different focal-length lenses may be designed to image different fields of view. In another example, the sensor IC die 1040 may be selected to have a different size for capturing different fields of view, and the pixel size and density may be selected to allow for higher resolution imaging. It should be noted that some of these components may be omitted altogether depending on the level of integration with the host smart device 10. In some embodiments, the indicia-reading module 1000 may return decoded information to the host device. In that case the indicia-reading module needs memory and a strong processor. In other embodiments, however, the indicia-reading module may return non-decoded images and rely on the host device to process the images and return the decoded results. In this case neither a dedicated CPU 1060 nor any memory 1080 are needed. A simple micro controller can be included to provide timing and control to the image sensor IC die 1040 and the illuminator-aimer circuit subassembly 1400.

Figure 5:
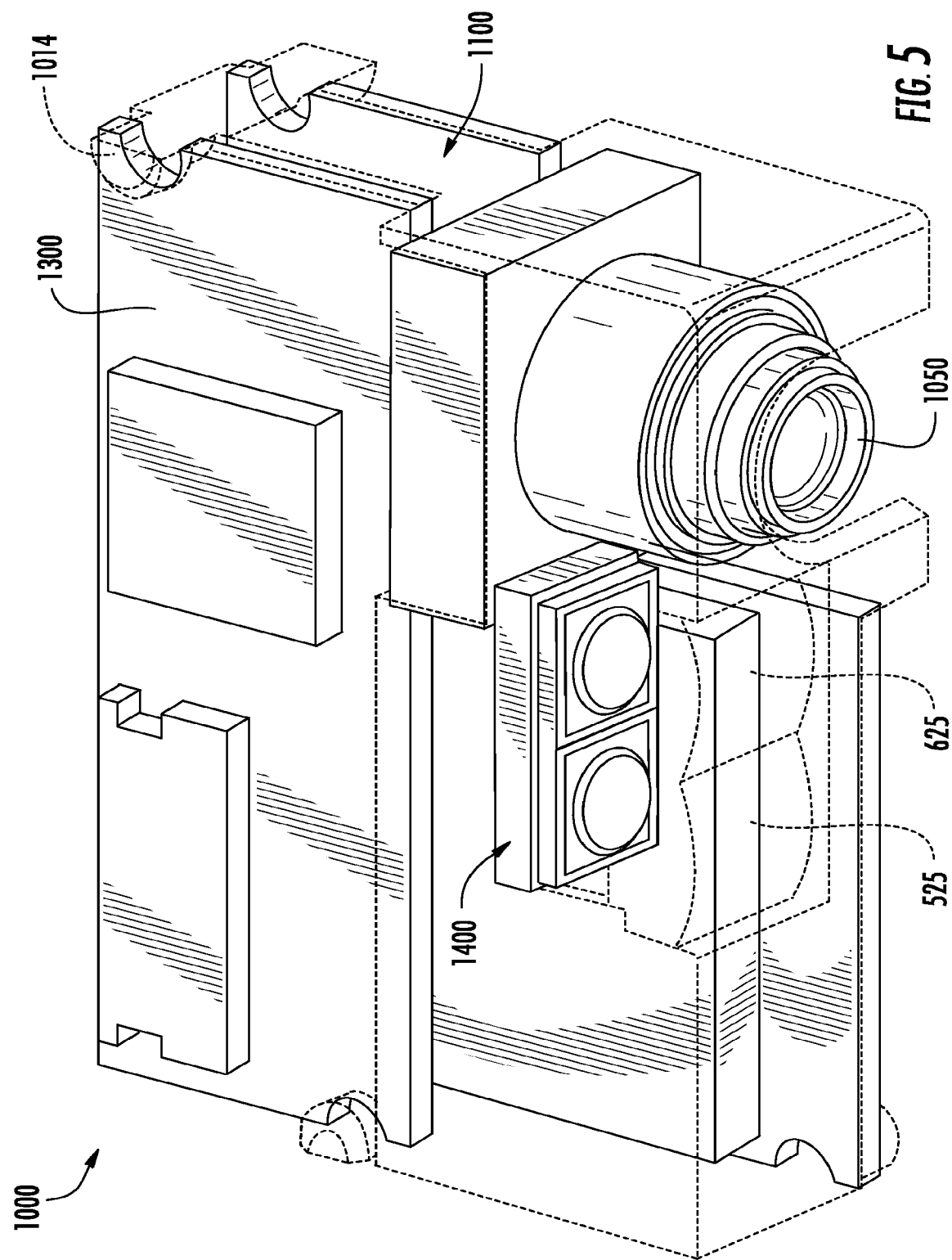
FIG. 5 depicts a first exemplary embodiment of the indicia-reader module with a decoded output.
Figure 6:
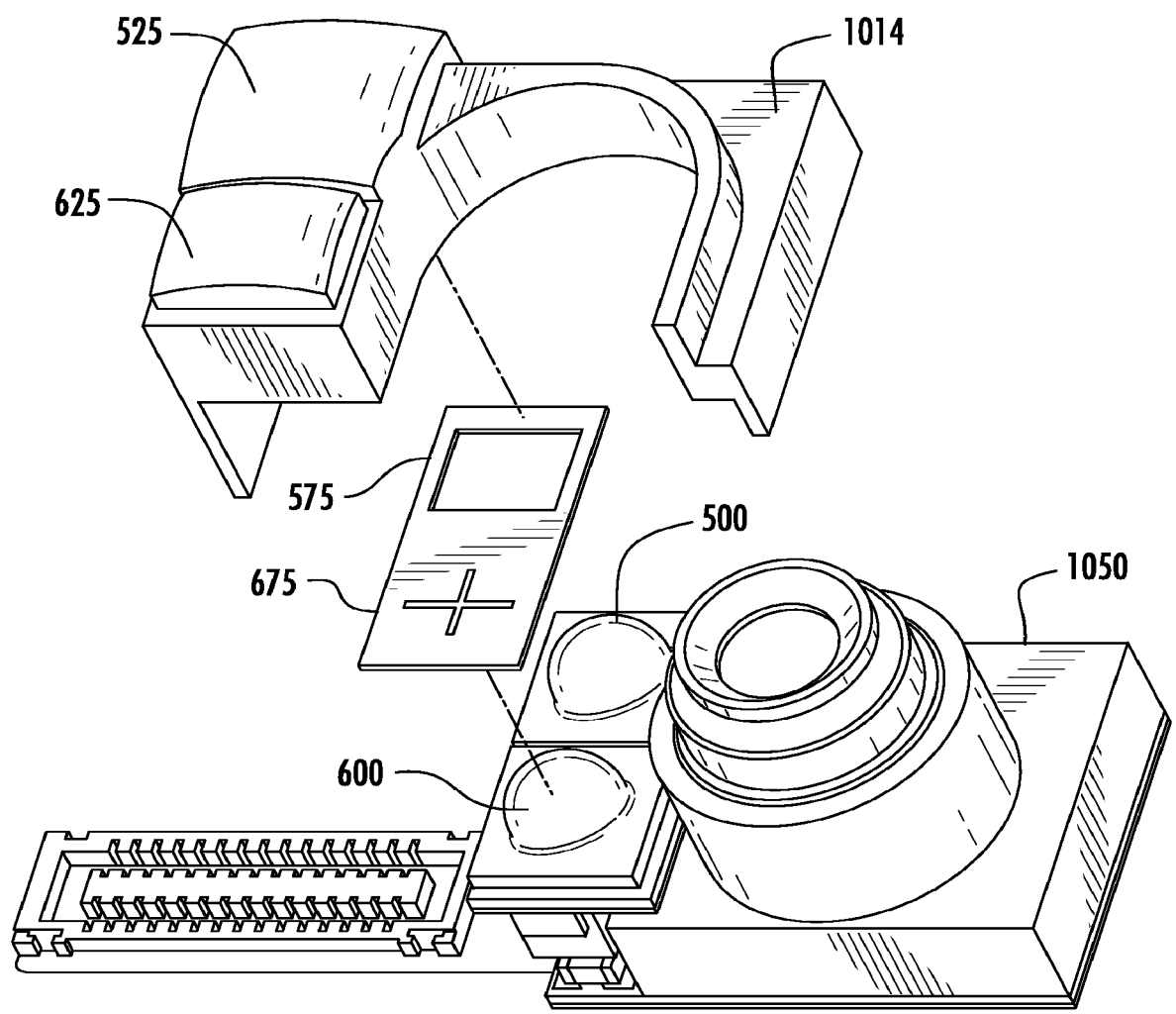
FIG. 6 depicts a second exemplary embodiment of the indicia-reader module with a non-decoded output.

FIG. 5 shows assembled indicia-reader module 1000 with a decoded output, and FIG. 6 shows an exploded view of an indicia-reader module 1000 with a non-decoded output. Both indicia-reading modules 1000 have thickness dimensions of less than about 10 millimeters (e.g., 7 millimeters or less) and can readily integrate into the narrow edge of a smart device that has a thickness dimension of less than about 10 millimeters (e.g., 9 millimeters). Both embodiments utilize the COB packaging of the sensor IC die and integrating the package with the housing 1048, IR cutoff filter 210, and the substrate 1042. The embodiments depicted in FIGS. 5 and 6 also share a similar approach in the subassembly circuits residing on their own boards, with each board being made from a thin rigid-flex material and interconnect with flex cables. These exemplary embodiments share the principal of saving cost and space by using a polycarbonate frame 1014 to hold the boards and to serve both as support and as the optics for the illuminator-aimer circuit subassembly. Finally, both will be integrated into their host device with mounting screws and pins to secure the indicia-reading module and prevent deformation and keep all components in place under shock and vibration.

Figure 7:
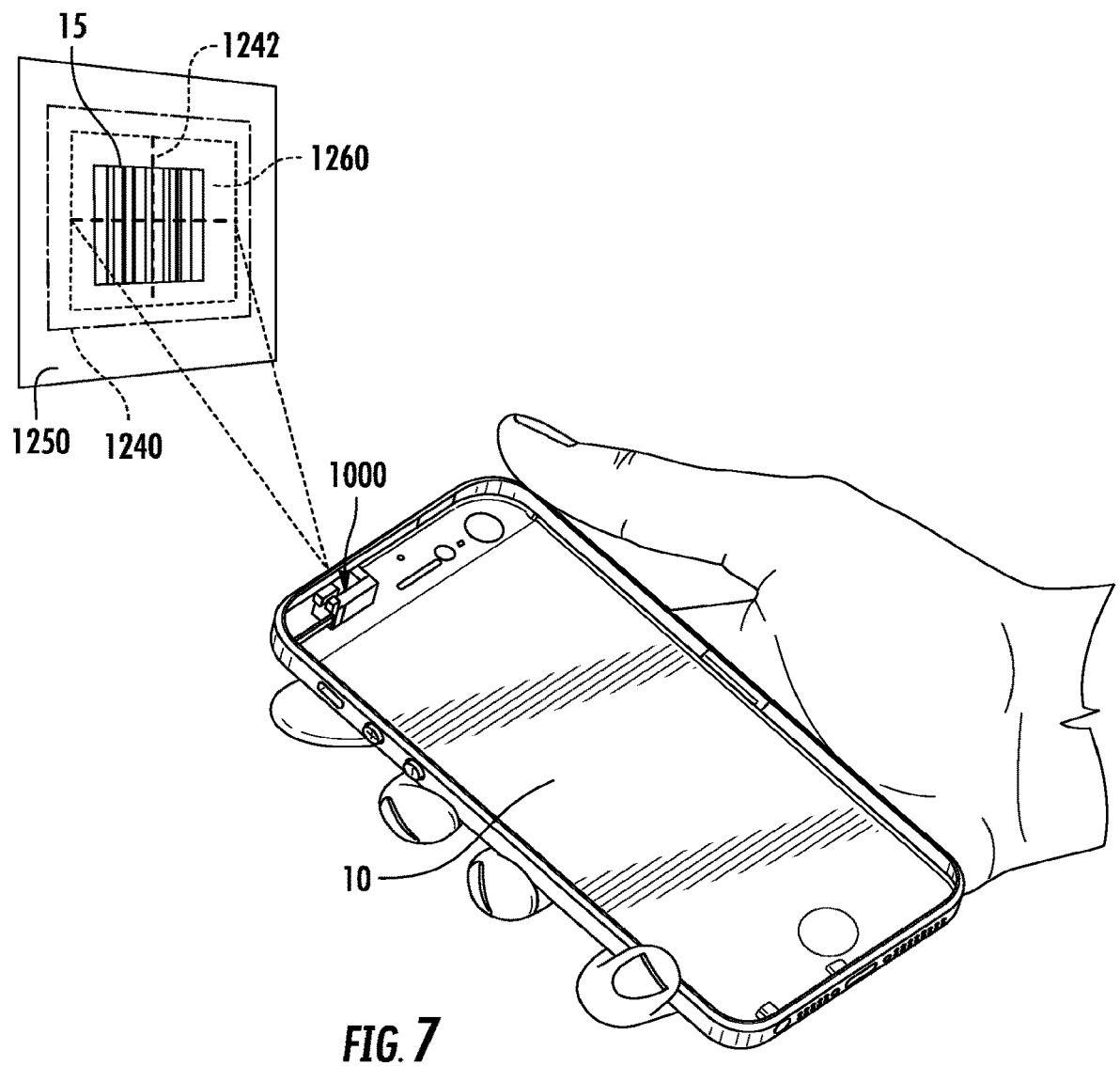
FIG. 7 depicts an exemplary smart device and exemplary integrated indicia reader showing the scale of the reader relative to the smart device.

FIG. 7 illustrates the relative size of the indicia-reader module with respect to the smart device 10. As depicted in FIG. 7, the indicia-reading module 1000 can be oriented by a user with respect to a target (e.g., a package label) bearing decodable indicia 15 so that an illumination pattern 1260 is projected onto decodable indicia 15. In the exemplary embodiment depicted in FIG. 7, a code symbol 15 is provided by a 10 bar code symbol, although a code symbol may also be provided by a 2D bar code symbol or optical character recognition (OCR) characters. The user aligns the aimer pattern 1242 and a takes a frame of image data. The frame that can be captured and subject to decoding can be a full frame (including pixel values corresponding to each pixel of image sensor array active area 1033, a partial frame in which a maximum number of pixels read out from image sensor array 1033 during operation of the indicia-reading module 1000), or a windowed frame that includes pixel values corresponding to less than a full frame of pixels of image sensor array 1033. A picture size of a windowed frame can vary depending on the number of pixels subject to addressing and readout for capture of a windowed frame.

An indicia-reading module 1000 can capture frames of image data at a rate known as a frame rate. A typical frame rate is 60 frames per second (FPS), which translates to a frame time (frame period) of 16.6 milliseconds. Another typical frame rate is 30 frames per second (FPS) which translates to a frame time (frame period) of 33.3 milliseconds per frame. A frame rate of the indicia-reading module 1000 can be increased (and frame time decreased) by decreasing of a frame picture size. After a good image of the indicia is obtained, it is processed, decoded, and sent to the host device the data is conditioned communication by the interface electronics 1110.

To supplement the present disclosure, this application incorporates entirely by reference the following commonly assigned patents, patent application publications, and patent applications: To supplement the present disclosure, this application incorporates entirely by reference the following patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,819; 8,544,737; 8,548,242; 8,548,420; 8,550,335; 8,550,354; 8,550,357; 8,556,174; 8,556,176; 8,556,177; 8,559,767; 8,559,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,593,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694;

International Publication No. 2013/163789;
International Publication No. 2013/173985;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0169999;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193407;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0068840;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292474;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0306734;
U.S. Patent Application Publication No. 2013/0307964;
U.S. Patent Application Publication No. 2013/0313324;
U.S. Patent Application Publication No. 2013/0313325;
U.S. Patent Application Publication No. 2013/0313326;
U.S. Patent Application Publication No. 2013/0327834;
U.S. Patent Application Publication No. 2013/0341399;
U.S. Patent Application Publication No. 2013/0342717;
U.S. Patent Application Publication No. 2014/0001267;

U.S. Patent Application Publication No. 2014/0002828;
U.S. Patent Application Publication No. 2014/0008430;
U.S. Patent Application Publication No. 2014/0008439;
U.S. Patent Application Publication No. 2014/0021256;
U.S. Patent Application Publication No. 2014/0025584;
U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/736,139 for an Electronic Device Enclosure, filed Jan. 8, 2013 (Chaney); U.S. patent application Ser. No. 13/750,304 for Measuring Object Dimensions Using Mobile Computer, filed Jan. 25, 2013; U.S. patent application Ser. No. 13/771,508 for an Optical Redirection Adapter, filed Feb. 20, 2013 (Anderson); U.S. patent application Ser. No. 13/780,158 for a Distraction Avoidance System, filed Feb. 28, 2013 (Sauerwein); U.S. patent application Ser. No. 13/780,196 for Android Bound Service Camera Initialization, filed Feb. 28, 2013 (Todeschini et al.); U.S. patent application Ser. No. 13/780,271 for a Vehicle Computer System with Transparent Display, filed Feb. 28, 2013 (Fitch et al.); U.S. patent application Ser. No. 13/780,356 for a Mobile Device Having Object-Identification Interface, filed Feb. 28, 2013 (Samek et al.); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/792,322 for a Replaceable Connector, filed Mar. 11, 2013 (Skvoretz); U.S. patent application Ser. No. 13/852,097 for a System and Method for Capturing and Preserving Vehicle Event Data, filed Mar. 28, 2013 (Barker et al.); U.S. patent application Ser. No. 13/895,846 for a Method of Programming a Symbol Reading System, filed Apr. 10, 2013 (Corcoran); U.S. patent application Ser. No. 13/902,110 for a System and Method for Display of Information Using a Vehicle-Mount Computer, filed May 24, 2013 (Hollifield); U.S. patent application Ser. No. 13/902,144, for a System and Method for Display of Information Using a Vehicle-Mount Computer, filed May 24, 2013 (Chamberlin); U.S. patent application Ser. No. 13/902,242 for a System For Providing A Continuous Communication Link With A Symbol Reading Device, filed May 24, 2013 (Smith et al.); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini); U.S. patent application Ser. No. 14/047,896 for Terminal Having Illumination and Exposure Control filed Oct. 7, 2013 (Jovanovski et al.) U.S. patent application Ser. No. 14/058,721 for a Terminal Configurable for Use Within an Unknown Regulatory Domain, filed Oct. 21, 2013 (Pease et al.); U.S. patent application Ser. No. 14/035,474 for Augmented-Reality Signature Capture, filed Sep. 24, 2013 (Todeschini); U.S. patent application Ser. No. 14/050,515 for Hybrid-Type Bioptical, filed Oct. 10, 2013 (Edmonds et al.); U.S. patent application Ser. No. 14/053,175 for Imaging Apparatus Having Imaging Assembly, filed Oct. 14, 2013 (Barber) U.S. patent application Ser. No. 14/055,234 for Dimensioning System, filed Oct. 16, 2013 (Fletcher); U.S. patent application Ser. No. 14/055,353 for Dimensioning System, filed Oct. 16, 2013 (Giordano et al.); U.S. patent application Ser. No. 14/055,383 for Dimensioning System, filed Oct. 16, 2013 (Li et al.); U.S. patent application Ser. No. 14/050,675 for Apparatus for Displaying Bar Codes from Light Emitting Display Surfaces, filed Oct. 10, 2013 (Horn et al.); U.S. patent application Ser. No. 14/053,314 for Indicia Reader, filed Oct. 14, 2013 (Huck); U.S. patent application Ser. No. 14/058,762 for Terminal Including Imaging Assembly, filed Oct. 21, 2013 (Gomez et al.); U.S. patent application Ser. No. 14/058,831 for System Operative to Adaptively Select an Image Sensor for Decodable Indicia Reading, filed Oct. 21, 2013 (Sauerwein); U.S. patent application Ser. No. 14/062,239 for Chip on Board Based Highly Integrated Imager, filed Oct. 24, 2013 (Toa et al.); U.S. patent application Ser. No. 14/065,768 for Hybrid System and Method for Reading Indicia, filed Oct. 29, 2013 (Meier et al.); U.S. patent application Ser. No. 14/074,746 for Self-Checkout Shopping System, filed Nov. 8, 2013 (Hejl et al.); U.S. patent application Ser. No. 14/074,787 for Method and System for Configuring Mobile Devices via NFC Technology, filed Nov. 8, 2013 (Smith et al.); U.S. patent application Ser. No. 14/082,379 for Method and Apparatus for Compensating Pixel Values in an Imaging, filed Nov. 18, 2013 (Hussey et al.); U.S. patent application Ser. No. 14/082,468 for Encoded Information Reading Terminal with Wireless Path Selection Capability, filed Nov. 18, 2013 (Wang et al.); U.S. patent application Ser. No. 14/082,551 for Power Management Scheme for Portable Data Collection Devices Utilizing Location and Position Sensors, filed Nov. 18, 2013 (Sauerwein et al.); U.S. patent application Ser. No. 14/087,007 for Scanner with Wake-Up Mode, filed Nov. 22, 2013 (Nahill et al.); U.S. patent application Ser. No. 14/087,190 for Optimal Range Indicators for Bar Code Validation, filed Nov. 22, 2013 (Hejl); U.S. patent application Ser. No. 14/093,484 for System for Capturing a Document in an Image Signal, filed Dec. 1, 2013 (Showering); U.S. patent application Ser. No. 14/093,487 for Method and System Operative to Process Color Image Data, filed Dec. 1, 2013 (Li et al.); U.S. patent application Ser. No. 14/093,490 for Imaging Terminal Having Image Sensor and Lens Assembly, filed Dec. 1, 2013 (Havens et al.); U.S. patent application Ser. No. 14/093,624 for Apparatus Operative for Capture of Image Data, filed Dec. 2, 2013 (Havens et al.); U.S. patent application Ser. No. 14/094,087 for Method and System for Communicating Information in an Digital Signal, filed Dec. 2, 2013 (Peake et al.); U.S. patent application Ser. No. 14/101,965 for High Dynamic-Range Indicia Reading System, filed Dec. 10, 2013 (Xian); U.S. patent application Ser. No. 14/107,048 for Roaming Encoded Information Reading Terminal, filed Dec. 16, 2013 (Wang et al.); U.S. patent application Ser. No. 14/118,400 for Indicia Decoding Device with Security Lock, filed Nov. 18, 2013 (Liu); U.S. patent application Ser. No. 14/138,206 for System and Method to Store and Retrieve Indentifier Associated Information, filed Dec. 23, 2013 (Gomez et al.); U.S. patent application Ser. No. 14/143,399 for Device Management Using Virtual Interfaces, filed Dec. 30, 2013 (Caballero); U.S. patent application Ser. No. 14/147,992 for Decoding Utilizing Image Data, filed Jan. 6, 2014 (Meier et al.); U.S. patent application Ser. No. 14/150,393 for Incicia-reader Having Unitary Construction Scanner, filed Jan. 8, 2014 (Colavito et al.); U.S. patent application Ser. No. 14/153,111 for Indicia Reading Terminal Including Frame Quality Evaluation Processing, filed Jan. 13, 2014 (Wang et al.); U.S. patent application Ser. No. 14/153,142 for Imaging Apparatus Comprising Image Sensor Array having Shared Global Shutter Circuitry, filed Jan. 13, 2014 (Wang); U.S. patent application Ser. No. 14/153,182 for System and Method to Manipulate an Image, filed Jan. 13, 2014 (Longacre et al.); U.S. patent application Ser. No. 14/153,213 for Apparatus Comprising Image Sensor Array and Illumination Control, filed Jan. 13, 2014 (Ding); U.S. patent application Ser. No. 14/153,249 for Terminal Operative for Storing Frame of Image Data, filed Jan. 13, 2014 (Winegar); U.S. patent application Ser. No. 14/154,207 for Laser Barcode Scanner, filed Jan. 14, 2014 (Hou et al.); U.S. patent application Ser. No. 14/154,915 for Laser Scanning Module Employing a Laser Scanning Assembly having Elastomeric Wheel Hinges, filed Jan. 14, 2014 (Havens et al.); U.S. patent application Ser. No. 14/158,126 for Methods and Apparatus to Change a Feature Set on Data Collection Devices, filed Jan. 17, 2014 (Berthiaume et al.); U.S. patent application Ser. No. 14/159,074 for Wireless Mesh Point Portable Data Terminal, filed Jan. 20, 2014 (Wang et al.); U.S. patent application Ser. No. 14/159,509 for MMS Text Messaging for Hand Held Indicia Reader, filed Jan. 21, 2014 (Kearney); U.S. patent application Ser. No. 14/159,603 for Decodable Indicia Reading Terminal with Optical Filter, filed Jan. 21, 2014 (Ding et al.); U.S. patent application Ser. No. 14/160,645 for Decodable Indicia Reading Terminal with Indicia Analysis Functionality, filed Jan. 22, 2014 (Nahill et al.); U.S. patent application Ser. No. 14/161,875 for System and Method to Automatically Discriminate Between Different Data Types, filed Jan. 23, 2014 (Wang).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An imaging module, comprising:
an illuminator-aimer circuit subassembly, wherein the illuminator-aimer circuit subassembly is positioned on a circuit board; and
a frame comprising at least two sides, the at least two sides defining a region, wherein the circuit board is positioned within the region and attached to the frame, wherein at least a portion of a first side of the frame is positioned in front of the illuminator-aimer circuit subassembly, wherein the frame serves as optics for the illuminator-aimer circuit subassembly.

2. The imaging module according to claim 1, wherein the frame comprises fittings molded into a clear polycarbonate frame, the fittings corresponding to the circuit board.

3. The imaging module according to claim 1, further comprising (i) a sensor module, (ii) a processing circuit subassembly, and (iii) an interface circuit subassembly, wherein each of (i) the sensor module, (ii) the processing circuit subassembly, and (iii) the interface circuit subassembly is constructed on discrete circuit boards, wherein each of the discrete circuit boards is interconnected by cable or flex or, rigid-flex interconnections.

4. The imaging module according to claim 1, wherein a simple micro controller provides timing and control to the illuminator-aimer circuit subassembly.

5. The imaging module according claim 1, wherein an illuminator driver circuit and an aimer driver circuit provide power to an illuminator light source and an aimer light source, respectively.

6. The imaging module according to claim 5, wherein upon triggering the illuminator driver circuit, the illuminator the driver circuit causes the illuminator light source to emit light; and wherein the light passes through a rectangular illuminator aperture.

7. The imaging module according to claim 6, wherein an image of the rectangular illuminator aperture is formed on a target via an illuminator lens and wherein the image of the rectangular illuminator aperture is a rectangular image of uniform white light.

8. An imaging apparatus, comprising:
an imaging module comprising an illuminator-aimer circuit subassembly for projecting of an electromagnetic radiation and an aiming pattern within a field of view of the imaging module, wherein the illuminator-aimer circuit subassembly is positioned on a rigid-flex circuit board, the rigid-flex circuit board attached directly to a frame, the frame comprising at least two sides, the at least two sides defining a region within which the rigid-flex circuit board is positioned and at least a portion of a first side of the frame serving as optics for the illuminator-aimer circuit subassembly.

9. The imaging apparatus according to claim 8, wherein the frame is integrated to the imaging apparatus with mounting pins and screws to prevent deformation of the frame.

10. The imaging apparatus according to claim 8, wherein the imaging module further comprises a sensor module for imaging the field of view of the imaging module, wherein the sensor module comprises a sensor integrated-circuit die which is a chip-on-board package, wherein the sensor module is positioned on a second rigid-flex circuit board, and wherein the second rigid-flex circuit board is attached directly to the frame.

11. The imaging apparatus according to claim 8, wherein the imaging module further comprises a processor circuit subassembly for rendering indicia information, wherein the processor circuit subassembly is positioned on a third rigid-flex circuit board, the third rigid-flex circuit board attached directly to the frame.

12. The imaging apparatus according to claim 8, wherein the imaging module further comprises an interface circuit subassembly connecting the imaging module to a host device, wherein the interface circuit subassembly is configured for receiving programming information and sending out diagnostic information, and wherein the interface circuit subassembly is positioned on a fourth rigid-flex circuit board, the fourth rigid-flex circuit board attached directly to the frame.

13. A method comprising:
projecting an aiming pattern onto a target by an aimer driver circuit;
aligning a reader module to the target according to the projected aiming pattern;
projecting an illumination pattern by an illuminator driver circuit;
capturing a frame of image data by an image sensor array, wherein the aimer driver circuit and the illuminator driver circuit are positioned on a rigid-flex circuit board, wherein the rigid-flex circuit board is positioned within a region defined by at least two sides of a frame, and wherein at least a portion of a first side of the frame serves as optics for the illuminator driver circuit and the aimer driver circuit;
processing the frame of image data, wherein the frame of image data includes a windowed frame; and
communicating the processed frame of image data to a host device by an interface circuit.

14. The method of claim 13, comprising varying a size of the windowed frame depending on a number of pixels subject to addressing and readout for capture of the windowed frame, wherein the windowed frame includes pixels corresponding to less than a full frame of pixels of the image sensor array.

15. The method of claim 13, comprising positioning the aimer driver circuit and the illuminator driver circuit on an illuminator-aimer circuit subassembly.

16. The method of claim 13, comprising powering the reader module by a power unit of an interface circuit subassembly.

17. The method of claim 16, comprising distributing power by the power unit at right level and at right time to various subassemblies.

18. The method of claim 13, comprising connecting the interface circuit with an illuminator-aimer subassembly via flex cable.

19. The method of claim 13, comprising driving an aimer light source by the aimer driver circuit, and projecting the aiming pattern through an aiming aperture and via the frame serving as an aimer lens, wherein the aiming pattern corresponds to a field of view of an imaging module.

20. The method of claim 13, comprising powering an illuminator light source by the illuminator driver circuit and projecting the illumination pattern through an illuminator aperture and via the frame serving as an illuminator lens toward the target within a field of view of an imaging module.

* * * * *